(12) United States Patent
Koenig et al.

(10) Patent No.: US 9,507,520 B2
(45) Date of Patent: Nov. 29, 2016

(54) TOUCH-BASED REORGANIZATION OF PAGE ELEMENT

(71) Applicant: Microsoft Corporation, Redmond, WA (US)

(72) Inventors: Kimberly Koenig, Redmond, WA (US); Caitlin Ashley-Rollman, Redmond, WA (US); Seth Fox, Seattle, WA (US); Ruth Kikin-Gil, Bellevue, WA (US); Christopher Rinker, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 91 days.

(21) Appl. No.: 14/136,909

(22) Filed: Dec. 20, 2013

(65) Prior Publication Data

US 2015/0169502 A1    Jun. 18, 2015

Related U.S. Application Data (60) Provisional application No. 61/916,738, filed on Dec. 16, 2013.

(51) Int. Cl.
*G06F 3/048* (2013.01)
*G06F 17/24* (2006.01)
*G06F 3/0488* (2013.01)
*G06F 3/0481* (2013.01)
*G06F 3/0484* (2013.01)
*G06F 17/21* (2006.01)

(52) U.S. Cl.
CPC ......... *G06F 3/04886* (2013.01); *G06F 3/0481* (2013.01); *G06F 3/0484* (2013.01); *G06F 3/0488* (2013.01); *G06F 3/04817* (2013.01); *G06F 3/04842* (2013.01); *G06F 17/211* (2013.01); *G06F 17/212* (2013.01); *G06F 17/24* (2013.01); *G06F 17/245* (2013.01)

(58) Field of Classification Search
CPC . G06F 3/0482; G06F 3/04842; G06F 3/0488
See application file for complete search history.

(56) References Cited

U.S. PATENT DOCUMENTS

| | | | |
|---|---|---|---|
| 5,608,850 A * | 3/1997 | Robertson | G06F 3/04815 345/427 |
| 5,666,552 A * | 9/1997 | Greyson | G06F 17/24 345/157 |
| 6,525,749 B1 | 2/2003 | Moran et al. | |
| 7,705,830 B2 | 4/2010 | Westerman et al. | |
| 8,117,556 B2 | 2/2012 | Eilers | |

(Continued)

OTHER PUBLICATIONS

"How to Sort List in Microsoft 2010" as available Sep. 19, 2010, pp. 1-5 https://www.youtube.com/watch?v=NiwEvuO8IAA.*

(Continued)

*Primary Examiner* — Scott Baderman
*Assistant Examiner* — Mario M Velez-Lopez
(74) *Attorney, Agent, or Firm* — Jessica Meyers; Tom Wong; Micky Minhas (57) ABSTRACT

An application of a touch-based device provides a touch-based reorganization of a page element. The application determines a modification associated with a touch action and a page element in response to detecting the touch action on the page element. A control and a hint associated with the modification is displayed in proximity to the page element. The page element is reorganized based on the modification.

20 Claims, 12 Drawing Sheets

(56) References Cited

U.S. PATENT DOCUMENTS

| | | | |
|---|---|---|---|
| 8,375,336 B2 | 2/2013 | Matthews et al. | |
| 8,952,912 B1* | 2/2015 | Hock | G06F 3/0483 |
| | | | 345/173 |
| 9,354,788 B2* | 5/2016 | Woo | G06F 3/0484 |
| 2004/0239691 A1* | 12/2004 | Sprang | G06F 3/04845 |
| | | | 345/651 |
| 2005/0114778 A1 | 5/2005 | Branson et al. | |
| 2006/0036945 A1 | 2/2006 | Radtke et al. | |
| 2006/0064640 A1* | 3/2006 | Forlines | G06F 3/04847 |
| | | | 715/702 |
| 2007/0101292 A1 | 5/2007 | Kupka | |
| 2008/0059898 A1* | 3/2008 | Deggelmann | G06F 3/048 |
| | | | 715/764 |
| 2008/0155413 A1* | 6/2008 | Ubillos | G06F 3/0481 |
| | | | 715/716 |
| 2009/0076792 A1* | 3/2009 | Lawson-Tancred | G06F 17/212 |
| | | | 704/2 |
| 2009/0167700 A1 | 7/2009 | Westerman et al. | |
| 2009/0189862 A1 | 7/2009 | Viberg | |
| 2009/0228842 A1* | 9/2009 | Westerman | G06F 3/04883 |
| | | | 715/863 |
| 2010/0306702 A1 | 12/2010 | Warner | |
| 2011/0161479 A1* | 6/2011 | Freishtat | G06Q 30/02 |
| | | | 709/223 |
| 2012/0096376 A1* | 4/2012 | Hibi | G06F 3/03545 |
| | | | 715/765 |
| 2012/0110439 A1* | 5/2012 | Rosner | G06F 17/21 |
| | | | 715/246 |
| 2012/0272144 A1* | 10/2012 | Radakovitz | G06F 3/04883 |
| | | | 715/702 |
| 2013/0055061 A1 | 2/2013 | Ashley-Rollman et al. | |
| 2013/0117653 A1 | 5/2013 | Sukhanov et al. | |
| 2013/0191781 A1* | 7/2013 | Radakovitz | G06F 9/4443 |
| | | | 715/810 |
| 2013/0212470 A1* | 8/2013 | Karunamuni | G06F 17/24 |
| | | | 715/243 |
| 2013/0232403 A1* | 9/2013 | Abrahami | G06F 17/211 |
| | | | 715/234 |
| 2013/0285930 A1 | 10/2013 | Thorsander et al. | |
| 2014/0268199 A1* | 9/2014 | Barber | G06F 3/122 |
| | | | 358/1.13 |
| 2014/0359448 A1* | 12/2014 | Paulus | G06F 3/04847 |
| | | | 715/722 |

OTHER PUBLICATIONS

Roth, et al.,"Bezel Swipe: Conflict-Free Scrolling and Multiple Selection on Mobile Touch Screen Devices" in Proceedings of the SIGCHI Conference on Human Factors in Computing Systems, Apr. 8, 2009, 4 pages.

"International Search Report & Written Opinion for PCT Application No. PCT/US2014/069176", Mailed Date: May 15, 2015, 13 Pages.

Ingram, et al., "Towards the Establishment of a Framework for Intuitive Multi-touch Interaction Design", In Proceedings of the International Working Conference on Advanced Visual Interfaces, May 21, 2012, pp. 66-73.

"International Preliminary Report on Patentability and Written Opinion Issued in PCT Application No. PCT/US2014/069176", Mailed Date: Mar. 4, 2016, 18 Pages.

"Second Written Opinion Issued in PCT Patent Application No. PCT/US2014/069176", Mailed Date: Nov. 12, 2015, 9 Pages.

* cited by examiner

TOUCH-BASED REORGANIZATION OF PAGE ELEMENT

PRIORITY CLAIM

This application claims priority to U.S. Provisional Patent Application Ser. No. 61/916,738 filed on Dec. 16, 2013. The disclosures of the foregoing provisional patent application are hereby incorporated by reference for all purposes.

BACKGROUND

Contemporary touch-based user experience with in-line document elements is not on par with traditional mouse or similar device based user experience. A mouse user interface allows a user to drag and drop an image, text, or table within a document. A touch-based user interface, on the other hand, may not be able to move text, in-line images, or in-line tables. In an example scenario of a touch-enabled device providing a touch-based user interface, dragging an in-line image with a finger may have no effect on the image's location, while using a mouse moves the image.

Significant proportion of document elements may therefore be not touch modifiable in modern touch-based user interfaces. Examples may include text selections, in-line images, or in-line tables. Other document elements that may not be modifiable by a mouse-based interface may include list items, document pages, page columns, table columns, and similar entities and objects associated with documents provided from a variety of sources.

Ease of reorganization is a key part of the document creation process. Touch-enabled devices may not enable reorganization of document elements similar to that provided in a traditional user interface or with a mouse. Lack of reorganization of document elements may diminish user experience with touch-enabled devices by causing frustration around various formatting scenarios. In many situations, touch-based modification of document elements is a baseline user expectation.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a touch-based reorganization of a page element. An application may detect a touch action on a page element of a document page. The application may determine a modification associated with the touch action and the page element. A control associated with the modification may be displayed in proximity to the page element. A hint associated with the modification may be displayed on the control such that page element can be reorganized based on the modification. The hint may be displayed relative to a user's finger or relative to the page element.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIGS. 2A and 2B are example diagrams illustrating a touch action based movement of text from a page of a document, according to embodiments;

DETAILED DESCRIPTION

As briefly described above, a touch-based reorganization of a page element may be provided. A touch action on a page element of a document page may be detected. A modification associated with the touch action and the page element may be determined. A control associated with the modification may be displayed in proximity to the page element. A hint associated with the modification may be displayed on the control to enable reorganization of the page element based on the modification.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide a touch-based reorganization of a page element. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

An in-line object as used herein refers to an object that behaves like a character and follows character positioning and alignment rules. A floating object as used herein refers to an object that is anchored to text, but may have a relative or absolute offset from the object's anchor or from document properties like margin or page size. A floating object may typically be placed anywhere on the page, while inline content may only be placed in specific locations and may jump from a valid drop location to another valid drop location. A "hint" may include a symbol indicating an object type (e.g., paragraph, image, etc.) and formatting (e.g., left, center, right, etc.), a short snippet of the text or object, and/or a thumbnail of the text or object. A hint may be under the finger of a user on a touch-based display or placed above the insertion point depending on implementation.

Figure 1:
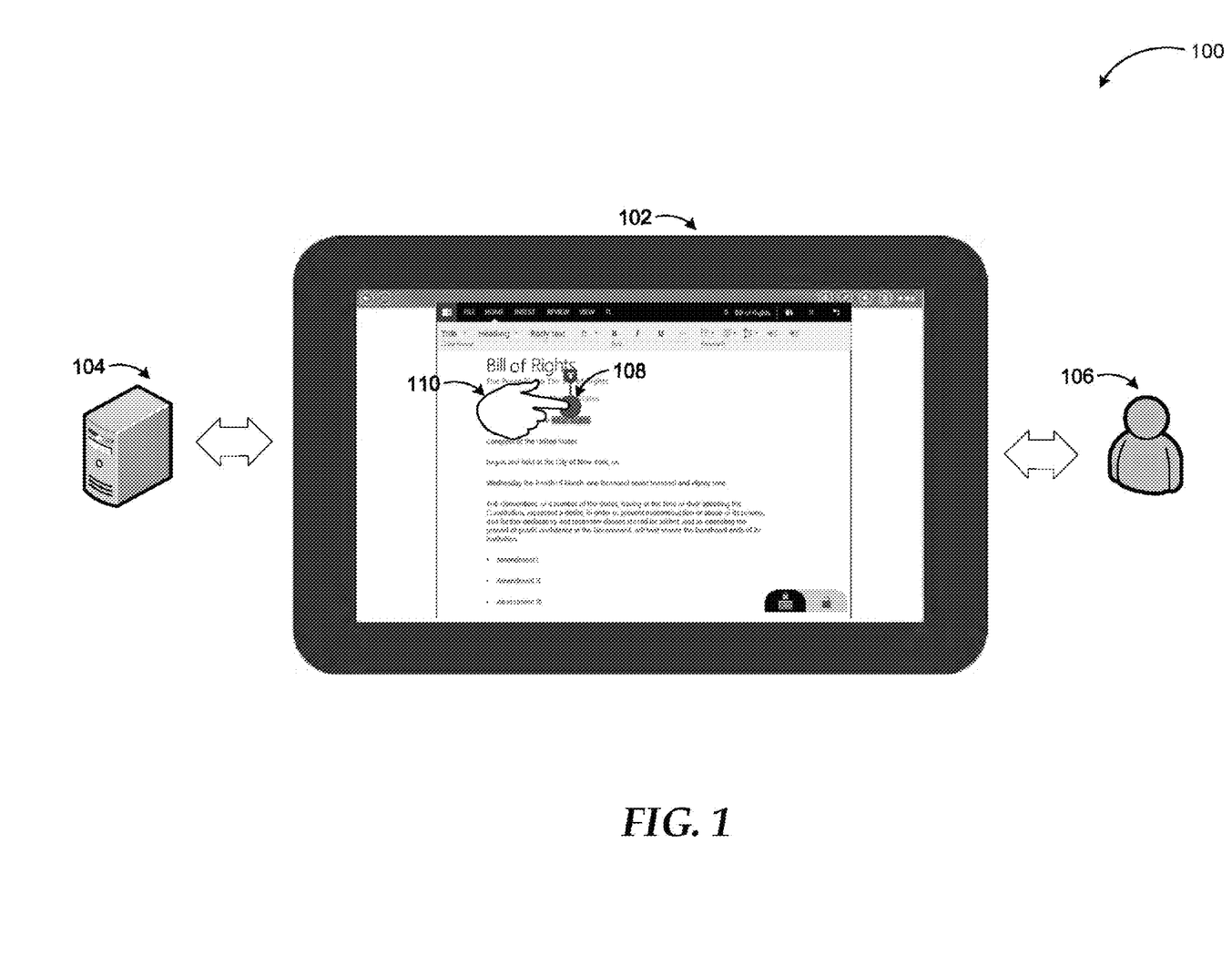
FIG. 1 is a conceptual diagram illustrating a touch-based reorganization of a page element—in this case, a text selection smaller than a paragraph—according to some embodiments.

FIG. 1 is a conceptual diagram illustrating a touch-based reorganization of a page element, according to embodiments.

As shown in diagram 100, a touch-based device 102 may present a document to a user 106. The touch-based device 102 may be any of a variety of touch-enabled devices including, but not exclusive to, a tablet device, a smart phone, a touch capable notebook, a touch capable monitor, and similar ones. The touch-based device 102 may detect a touch action 110 such as a swipe, a pinch, a spread, a tap, a tap and hold, and similar ones as an interaction. The touch action 110 on the touch-based device 102 may be referred to as a gesture. The touch-based device 102 may execute operation(s) corresponding to the gesture to allow the user 106 to interact with the displayed document. One of the operations may include presentation of a control 108 to aid the user 106 in reorganizing a page element associated with the displayed document.

The displayed document may include variety of internal or external documents. The documents may include text, lists, tables, graphics, video, audio, combinations of each and similar ones. The device 102 may retrieve a displayed document from an external device such as server 104. An example may include the device 102 retrieving a document such as a web page from an external resource such as the server 104 and displaying the web page to the user 106.

While the example system in FIG. 1 has been described with specific components including a touch-based device 102 providing a touch-based reorganization of a page element, embodiments are not limited to these components or system configurations and can be implemented with other system configuration employing fewer or additional components. The approaches discussed here may be applied to any compliance process provided by an application and/or a server using the principles described herein.

Figure 2B:
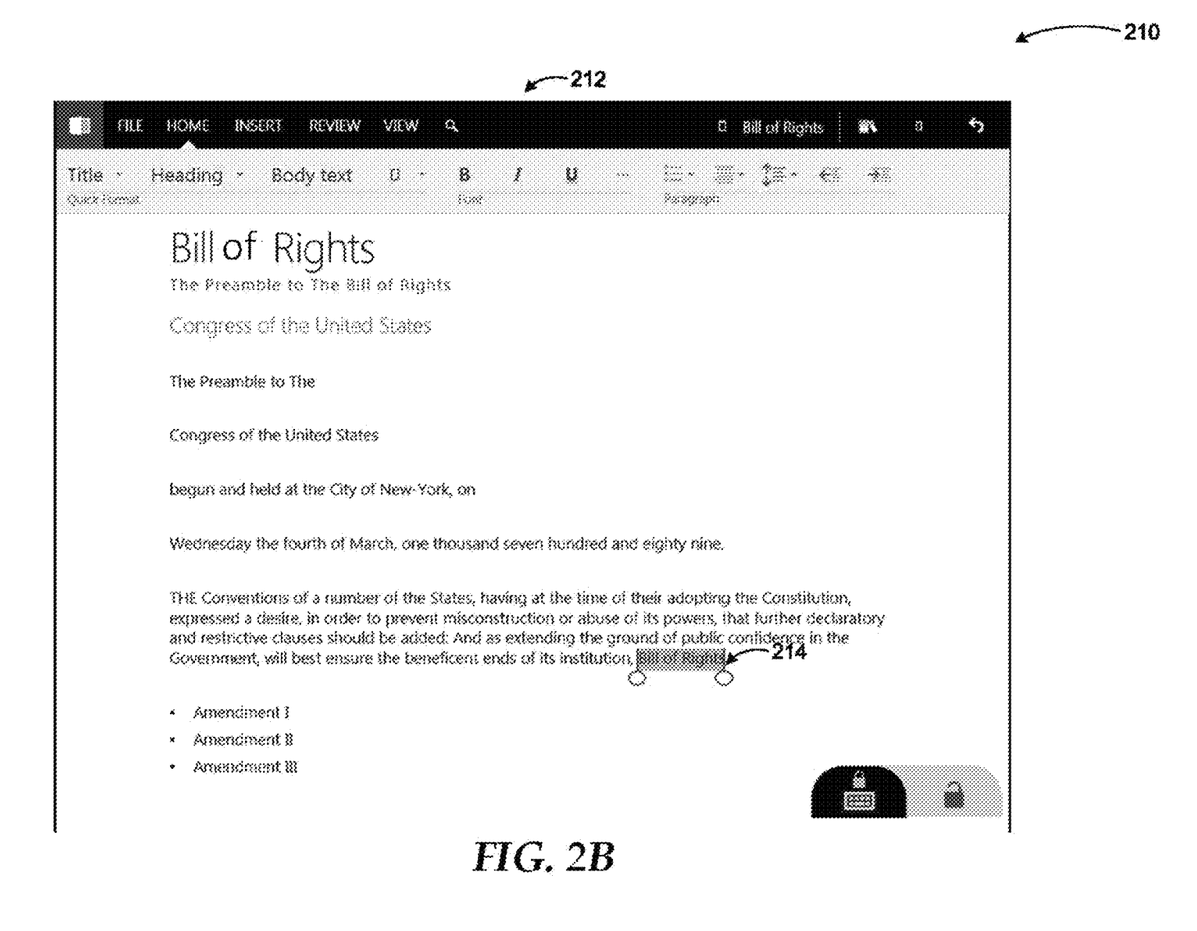

FIGS. 2A and 2B are example diagrams illustrating a touch action based modification of text from a page of a document, according to embodiments. Diagrams 200 and 210 illustrate a modification of inline text through a touch action.

An application 202 may present a page of document to a user on a display surface of a touch-based device. A touch action may be detected on the display surface. A page element such as text 204 may be determined to be associated with the touch action. The user may highlight the text to indicate their intent to reorganize it, or application 202 may highlight the text 204 to guide the user during a modification of the text 204.

A control 206 associated with the touch action may be displayed in proximity to the text 204. The control may be determined to be associated with the text. A hint may be displayed on the control 206 to inform the user of the modification to be performed on the text 204. The modification may include a movement of the text within the document displayed by the application 202. The modification may also include a formatting change associated with the text such as font type change, character size change, color change, and similar ones. The modification may further include a selection action such as cut, copy, paste, delete, and similar ones associated with the text 204 or a portion of the text 204.

Diagram 210 illustrates a conclusion of the modification of the text 214. The application 212 may place text 214 at a new location as determined by the touch action. The text 214 may be highlighted and encompassed by another menu that includes selection controls, which may be used to expand or shrink the selection of text 214. The selection controls may be placed at a start and/or an end of the selection.

Figure 3A:
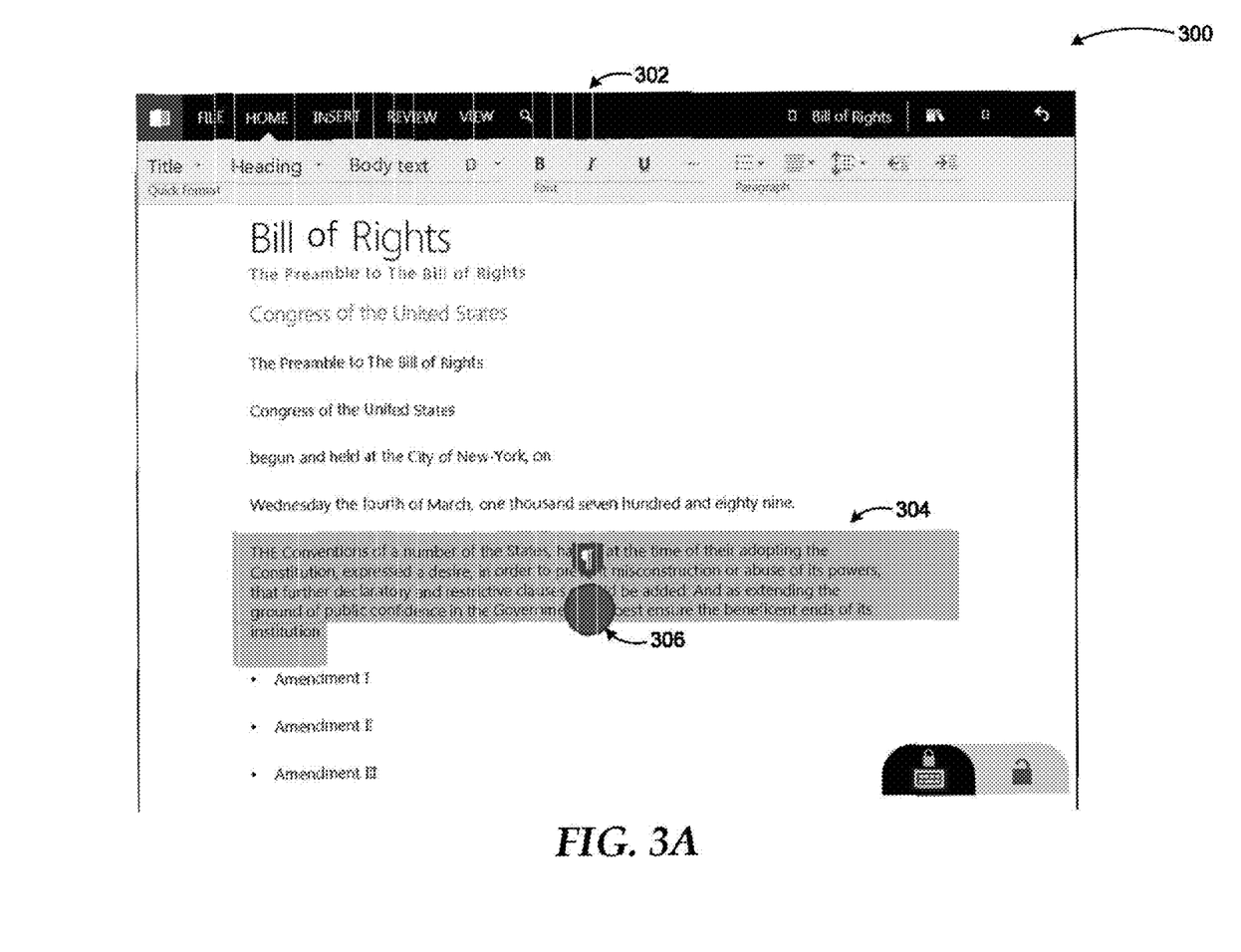
FIGS. 3A and 3B are example diagrams illustrating a touch action based movement of a document part—in this case, a paragraph—according to embodiments.
Figure 3B:
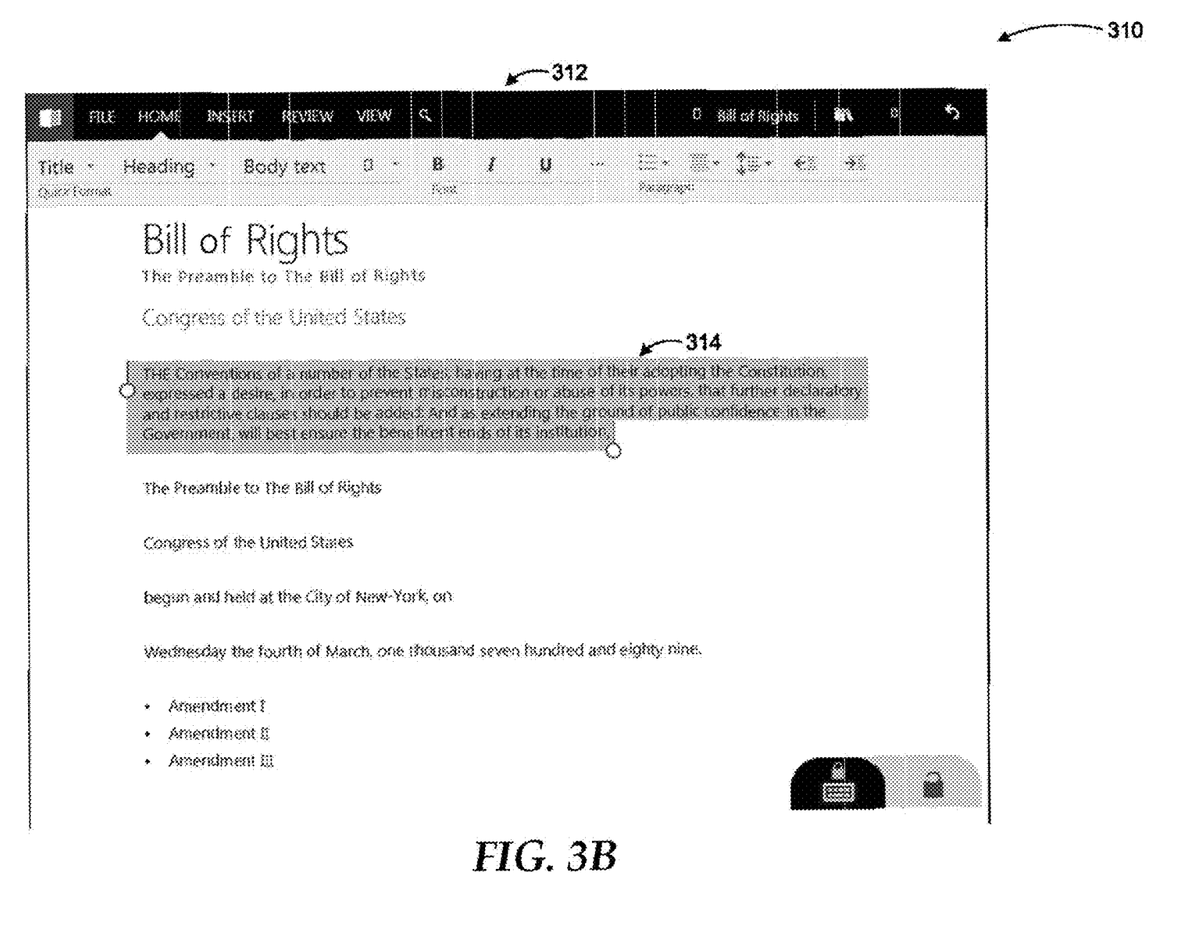

FIGS. 3A and 3B are example diagrams illustrating a touch action based modification of a document part, according to embodiments.

As shown in the diagram 300, the application 302 may detect a touch action on document part 304. The document part 304 may include a paragraph, a section, a table of contents, a header, a footer, a page column, a single page, a group of pages, and similar ones. A control 306 may be displayed in response to determining the touch action associated with the document part 304 in proximity to the document part. The control 306 may be determined to be associated with the document part 304. A hint may be displayed on the control 306 to inform the user of a modification associated with the touch action to be performed on the document part 304. The modification may include a movement of the document part to another location on the document.

Diagram 310 illustrates a conclusion of the modification of the document part 314. The application 312 may place document part 314 at a new location as determined by the touch action. The document part 314 may be highlighted and encompassed by a control that includes selection controls, which may be used to expand or shrink the selection of document part 314.

Figure 4A:
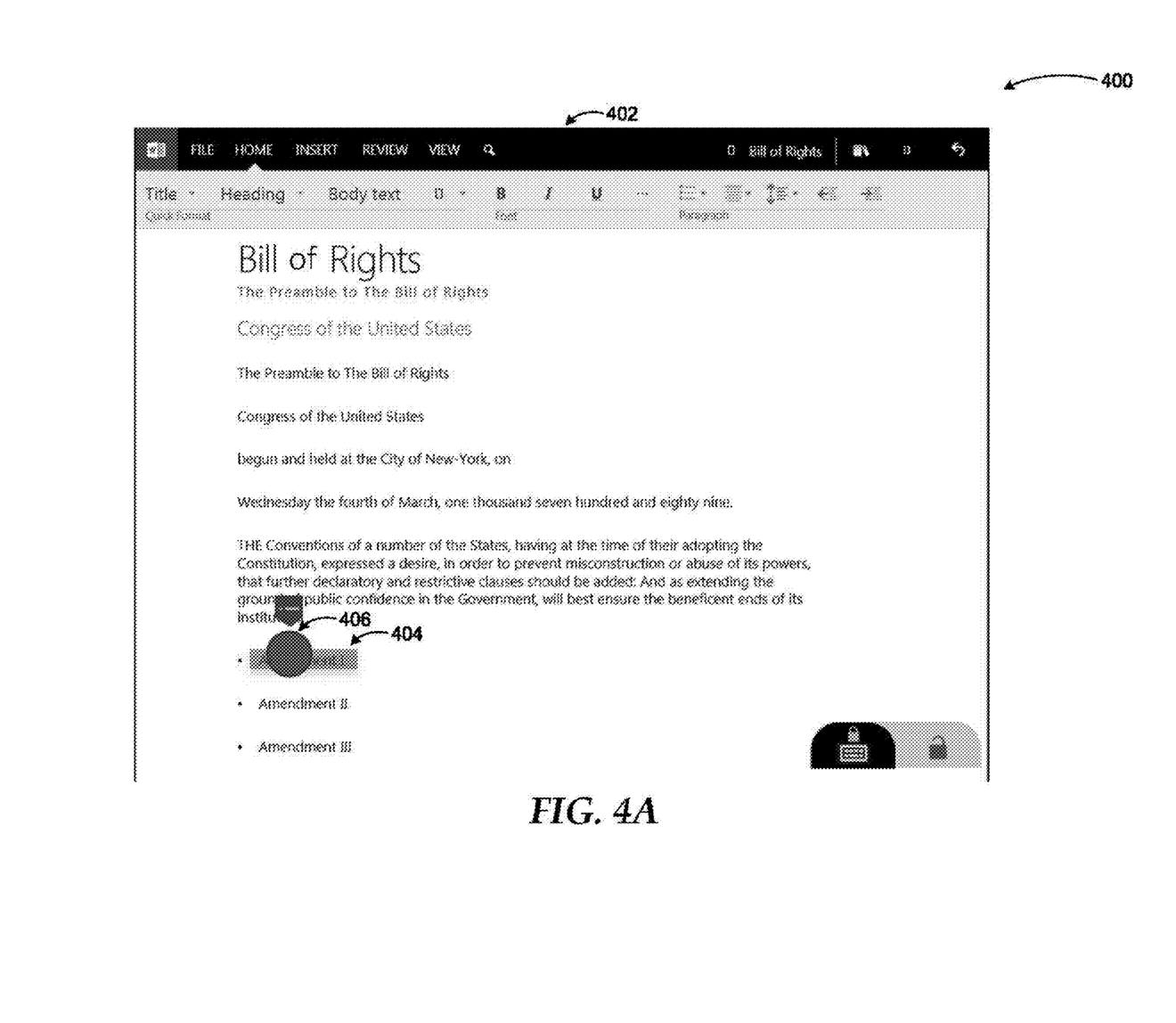
FIGS. 4A and 4B are example diagrams illustrating a touch action based movement of a list from a page of a document, according to embodiments.
Figure 4B:
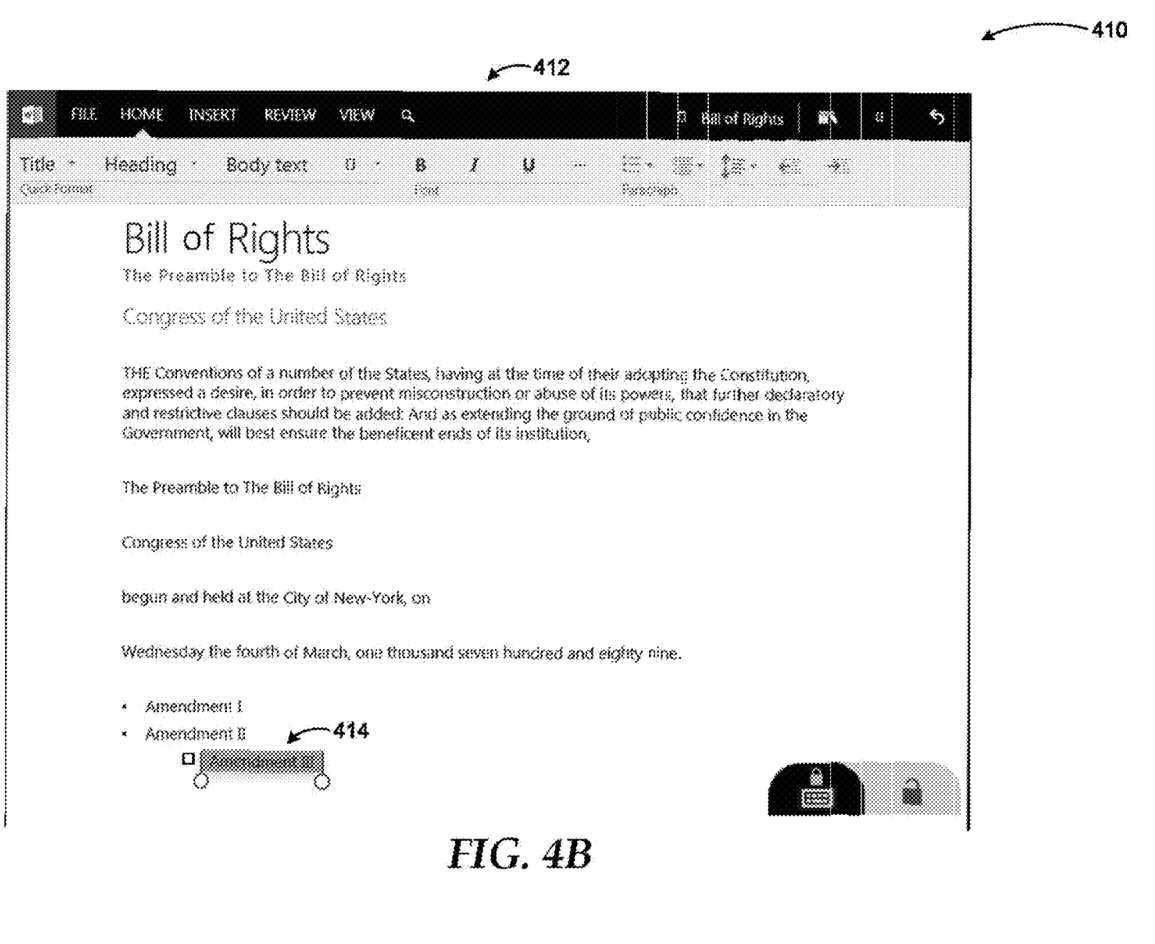

FIGS. 4A and 4B are example diagrams illustrating a touch action based modification of a list from a page of a document, according to embodiments.

As shown in diagram 400, the application 412 may detect a touch action on a list of a displayed document. The touch action may include a modification of one or more elements of a list or an entirety of the list. The modification may also include indenting the list, formatting the list, movement of the list, and similar ones. A control 406 associated with the list and the touch action may be displayed in proximity to an element of the list 404. A hint may be displayed on the control 406 to inform the user of the modification associated with the touch action to be performed on the list 404.

Diagram 410 illustrates a conclusion of the modification of the list 414. The application 412 may indent an item of the list 414. The item of the list 414 may be highlighted and encompassed by another control that includes selection controls, which may be used to expand or shrink the selection of item of the list 414.

Figure 5A:
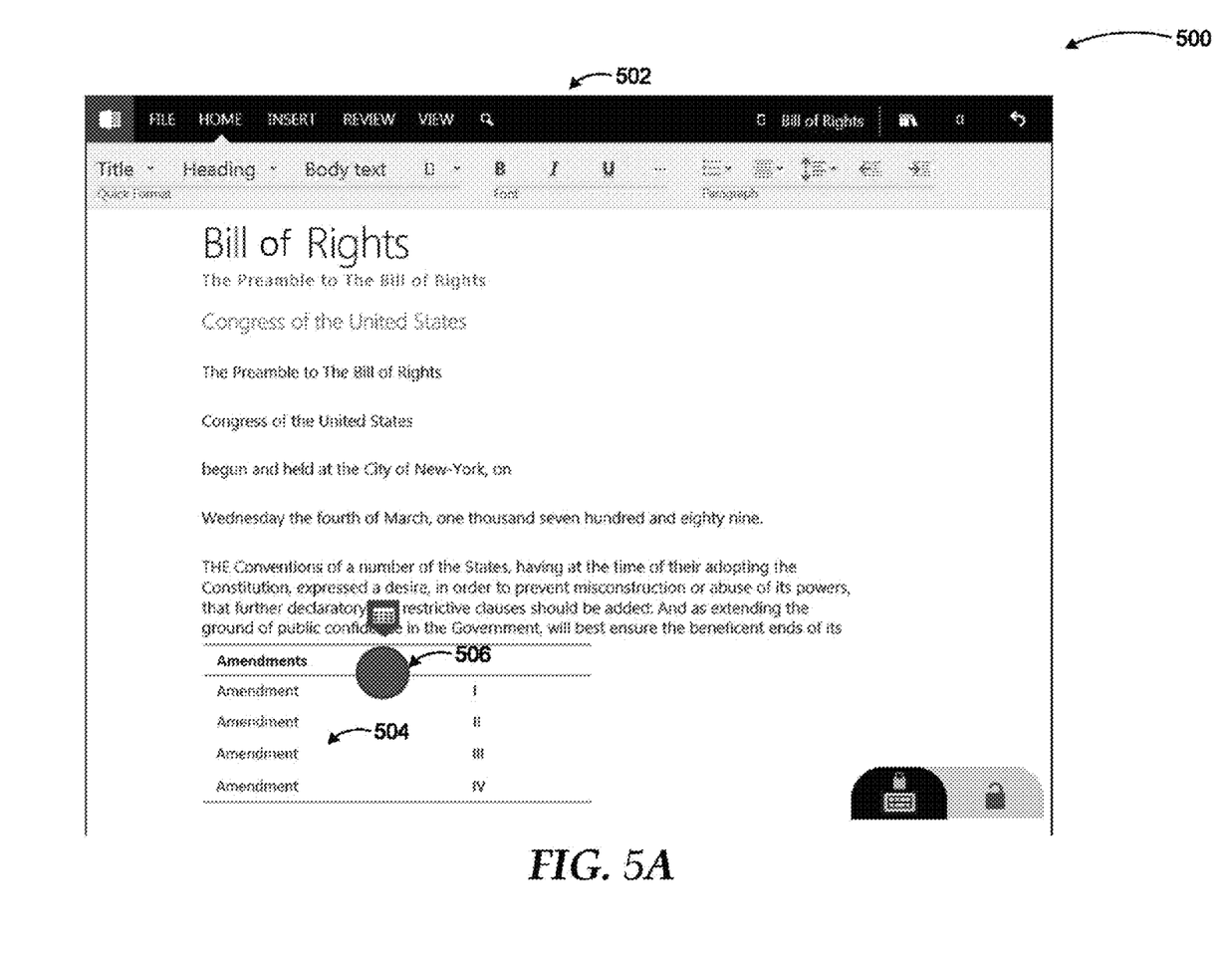
FIGS. 5A and 5B are example diagrams illustrating a touch action based movement of a table from a page of a document, according to embodiments.
Figure 5B:
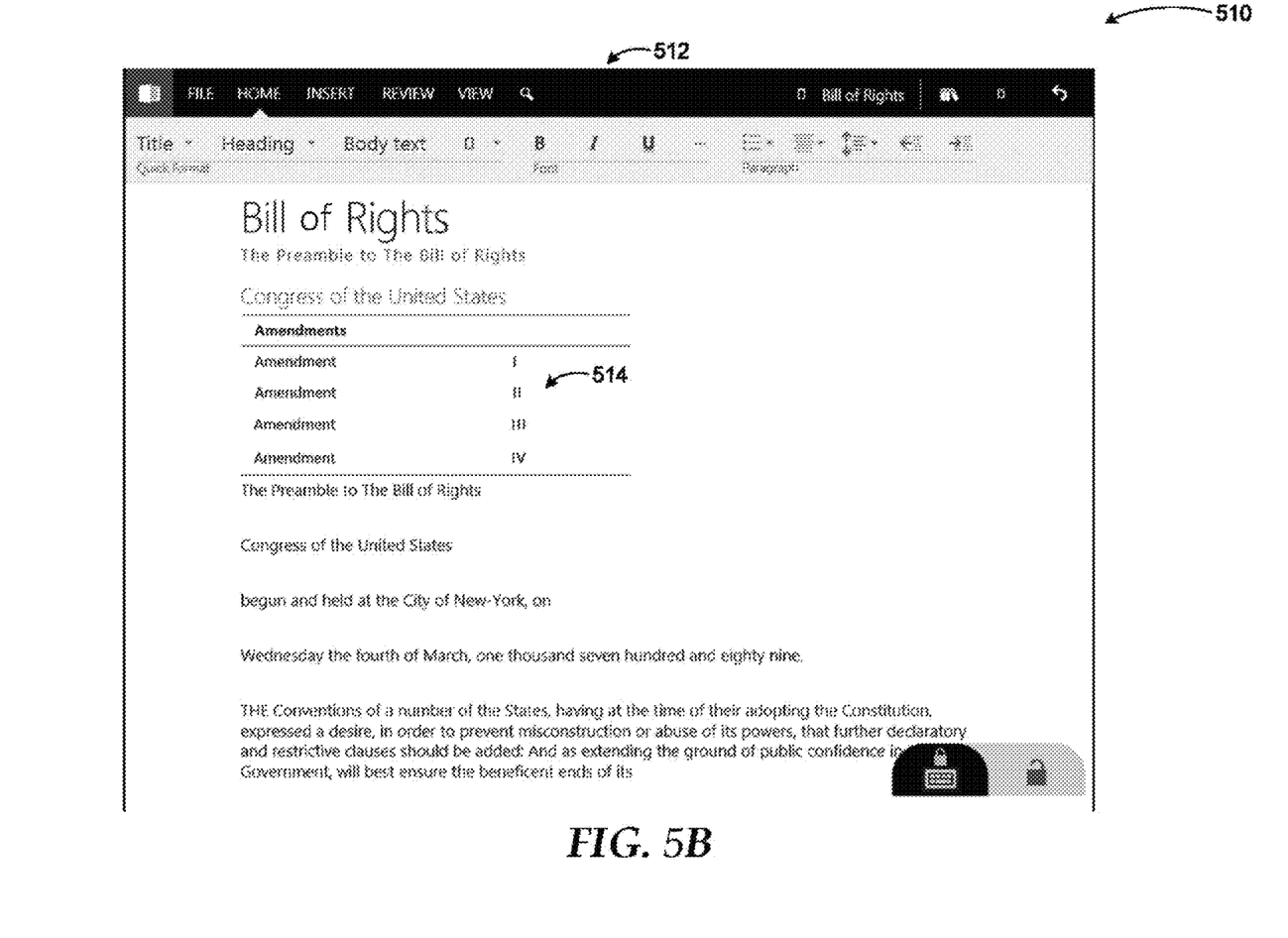

FIGS. 5A and 5B are example diagrams illustrating a touch action based modification of a table from a page of a document, according to embodiments.

As shown in diagram 500, a page element such as a table 504 may be modified through a touch action. The application 502 may detect the touch action on the table 504. A control 506 may be displayed in proximity to the table 504 to assist the user during a modification of the table 504 through the touch action. The modification may include an edit action of the entirety of the table 504, one or more columns, rows, or cells of the table 504. The modification may also include formatting, movement, highlighting, removal, and similar actions associated with the table 504. A hint may be displayed on the control 506 to inform the user of the modification associated with the touch action to be performed on the table 504.

Diagram 510 illustrates a conclusion of the modification on the table 514. The application 512 may place the table 514 in a new location associated with the touch action upon the conclusion of the modification.

Embodiments may not be limited to example scenarios described above. Other page elements may be modified by a touch action. Other page elements may include graphics, images, video, audio, and similar ones. In addition, combinations of page elements may be modified using a touch action. The page elements may be selected from multiple pages using concurrent or subsequent touch actions. One or more controls may be displayed to aid in the modification associated with the one or more page elements. Modifications may include formatting, movement, removal, editing, highlighting, expansion, reduction, and similar operations associated with the page element or a portion of the page element.

In addition to provided examples of modifications, touch actions may be associated with an indent, an outdent, a left align, a center align, a right align, and a vertical reorganization, a horizontal reorganization, a hierarchical reorganization operation associated with the page element or a portion of the page element, or placement of a page element within another page element, such as text inside of another paragraph or object. The operations may be executed while displaying an associated control within proximity of the page element. The control may display a hint informing the user of the associated operation. Examples provided are not in a limiting sense. Other page element operations may be executed in relation to page elements of a document displayed on a document processing, a spreadsheet, an image editing, a presentation, and similar applications.

According to some embodiments, the modification may be determined based on a context associated with the touch action and the page element. In an example scenario, a document part such as a paragraph may be placed between paragraphs but not inside a word. Another example may include moving a selection of a text smaller than a paragraph to a location inside other text between word boundaries. The selection of the text may not be placed inside a word. Paragraphs, images, and tables may be placed in line between other page elements. Elements of a list may be placed in between other elements of the list. An entirety of a list may be treated like a paragraph. Other list items may be placed inside the list.

According to other embodiments, the hint and the control may be rendered to follow the touch action. The hint may be an icon, a preview, a thumbnail, a text snippet and similar ones. A left, center, or right alignment guide may be displayed when the touch action is in proximity to a left, center, or right of a display pane of the application. The hint may display an icon to indicate that the page element may be aligned to the left, center, or right if the user stops the touch action at the left, center, or right locations. The hint may vary depending on the page element being moved—for example, a bullet or number icon for a list item, a table icon for a table, a text icon for text, and similar ones. In addition, the hint may update to display a new bullet or a number style during the modification of a list.

According to further examples, the application may display alignment guides during the modification of the page element. Horizontal alignment guides may be displayed to indicate valid vertical placement locations, such as a paragraph, table, image, or similar ones being inserted between other paragraphs, images, tables, or similar ones. Vertical alignment guides may be displayed to indicate valid horizontal placement locations, such as list item indent or outdent locations or left, center, or right alignment locations associated with page elements. Alignment guides may be rendered when a user begins the touch action associated with the page element in order to indicate the page element's original location, a rail along which the touch element is snapped and moving, or the location where the page element may arrive if the user stops the touch action. Alignment guides may be rendered to indicate when a state has been entered (e.g., an image has been centered). Alignment guides may illustrate a state of the page element at a stop of the touch action.

In addition or in place of a rendered hint following the touch action, the page element may be rendered to follow the touch action in a sticky state in relation to the touch action. During the course of the touch action, other page elements along of the course of the touch action may move or slide to clear a space for the page element. The other elements may occupy a space left behind by the page element. The movement of the page element and adjacent page elements may be animated to convey a sense of a sliding page element.

Furthermore, the application may execute visual changes to the page element and adjacent page elements during the course of the touch action. Examples may include a section color change or color darkening of the page element, outlining of the page element, a drop shadow incorporated to the page element, a ghost out or a de-emphasis of the page element, an animation of the page element, and similar ones. The animation of the page element may include a large size page element compared to an original size (e.g., a thumbnail of the content), a floating page element loose from adjacent page elements, fading in and fading out page element compared to adjacent page elements, a sliding up and down page element compared to adjacent page elements. Adjacent page elements may also be animated to illustrate a movement of the page element.

According to some embodiments, a user may be allowed to enter the page element into a reorganization mode with the touch action. In the reorganization mode, page elements' appearance may change or the appearance may be animated to differentiate the page element from editing. The page element may be animated to provide a sense of floatation in a low gravity environment. The page element may also be shadowed to appear as a popped off object superimposed on a canvas of the document.

The example scenarios and schemas in FIGS. 2 and 5 are shown with specific components, data types, and configurations. Embodiments are not limited to systems according to these example configurations. A touch-based reorganization of a page element may be implemented in configurations employing fewer or additional components in applications and user interfaces. Furthermore, the example schema and components shown in FIGS. 2 and 5 and their subcomponents may be implemented in a similar manner with other values using the principles described herein.

Figure 6:
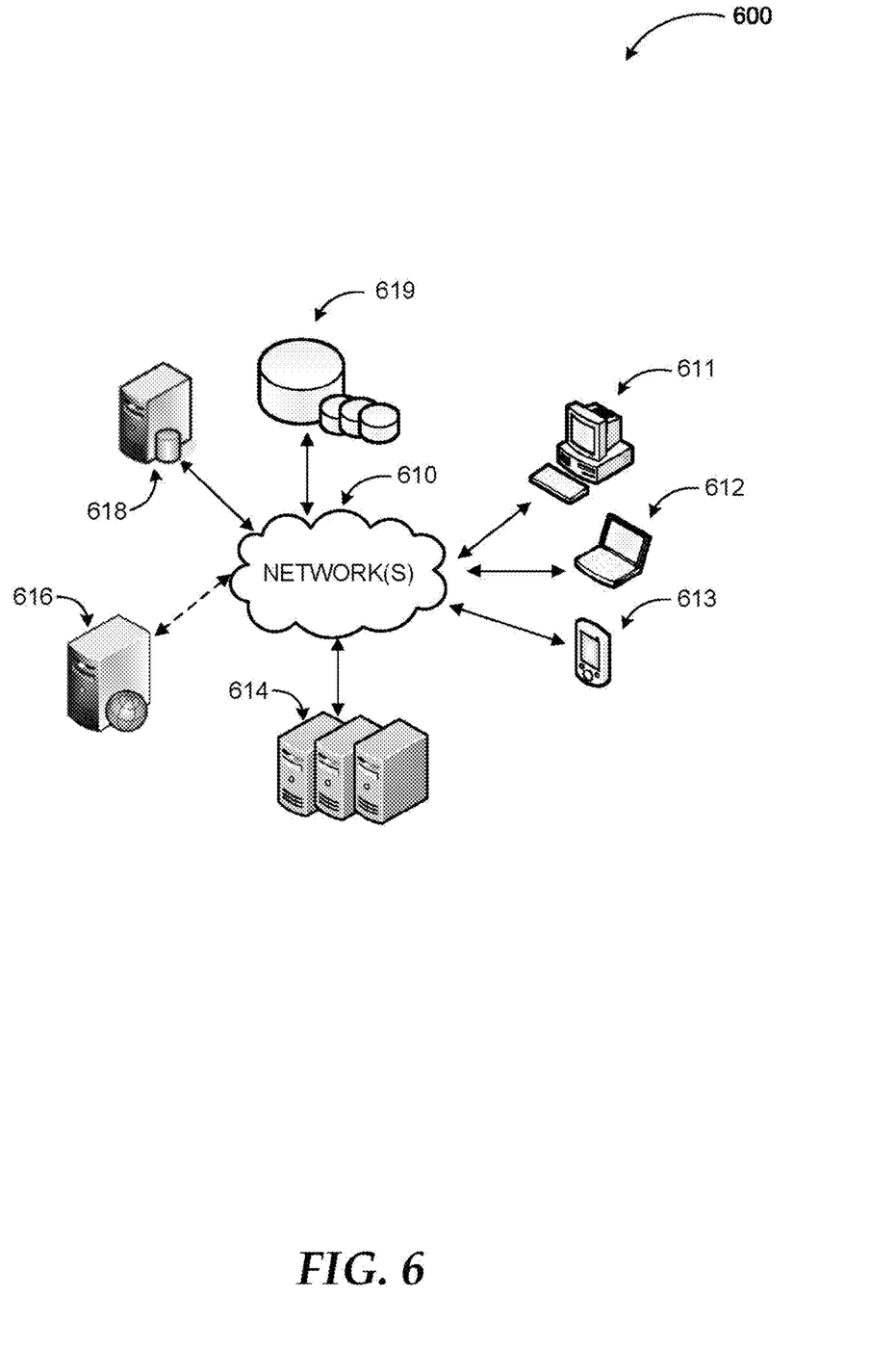
FIG. 6 is a simplified networked environment, where a system according to embodiments may be implemented.

FIG. 6 is an example networked environment, where embodiments may be implemented. A system providing a touch-based reorganization of a page element may be implemented via software executed over one or more servers 614 such as a hosted service. The platform may communicate with client applications on individual computing devices such as a smart phone 613, a laptop computer 612, or desktop computer 611 ('client devices') through network(s) 610.

Client applications executed on any of the client devices 611-613 may facilitate communications via application(s) executed by servers 614, or on individual server 616. A modification associated with a touch action and a page element may be determined in response to detecting the touch action on the page element. A control and a hint associated with the modification may be displayed in proximity to the page element. The page element may be modified based on the modification. The document that includes the page element may be stored in data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short-range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to provide a touch-based reorganization of a page element. Furthermore, the networked environments discussed in FIG. 6 are for illustration purposes only. Embodiments are not limited to the example applications, modules, or processes.

Figure 7:
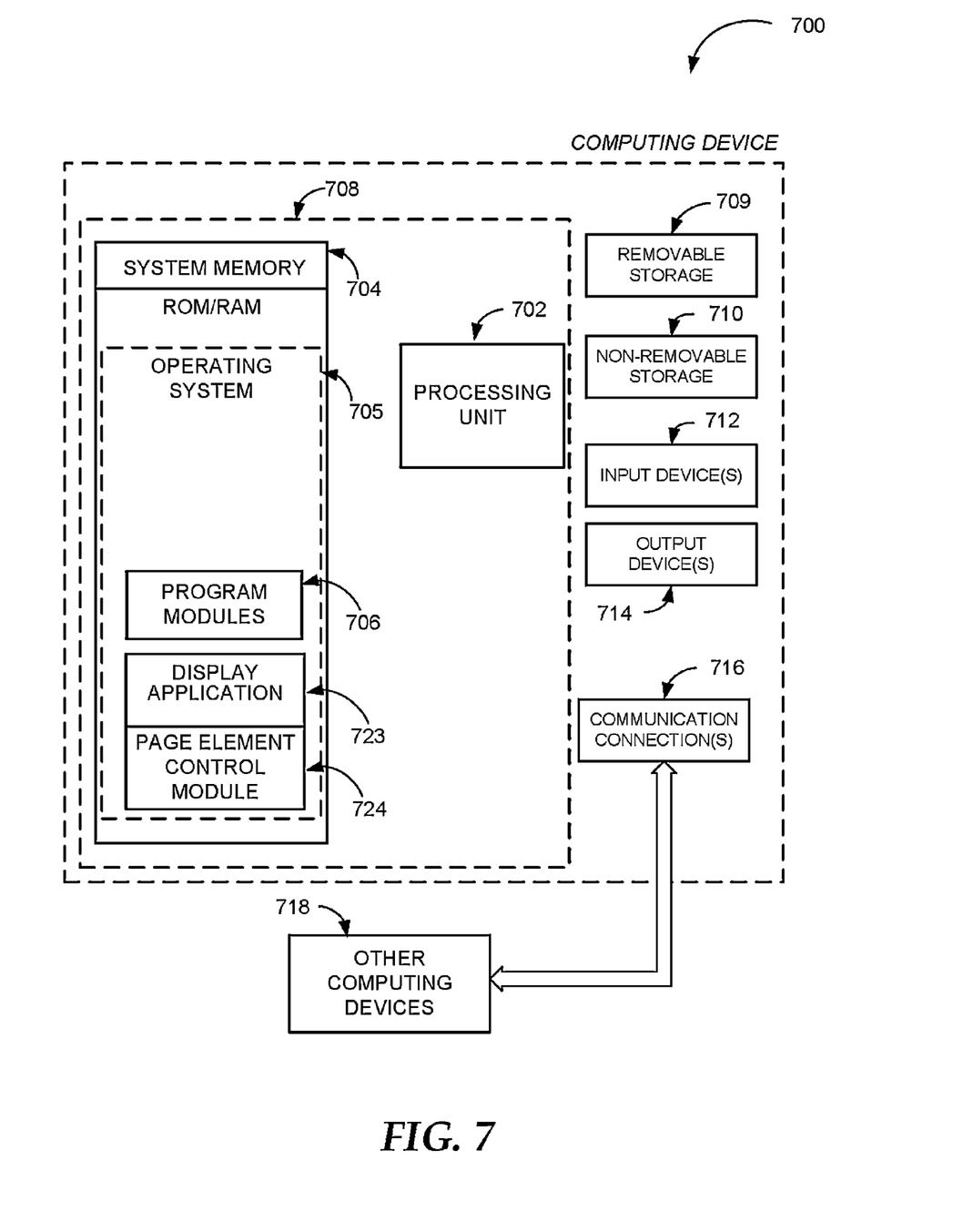
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be any computing device executing an application according to embodiments and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, an application 722, and a keyboard module 724.

The application 722 may determine a modification associated with the touch action and the page element in response to detecting the touch action on the page element. The page element control module 724 may display a control and a hint associated with the modification in proximity to the page element. The page element may be reorganized based on the modification by the application 722. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, an optical capture device for detecting gestures, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short-range network, and comparable mechanisms. Other devices 718 may include computer device(s) that execute communication applications, web servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
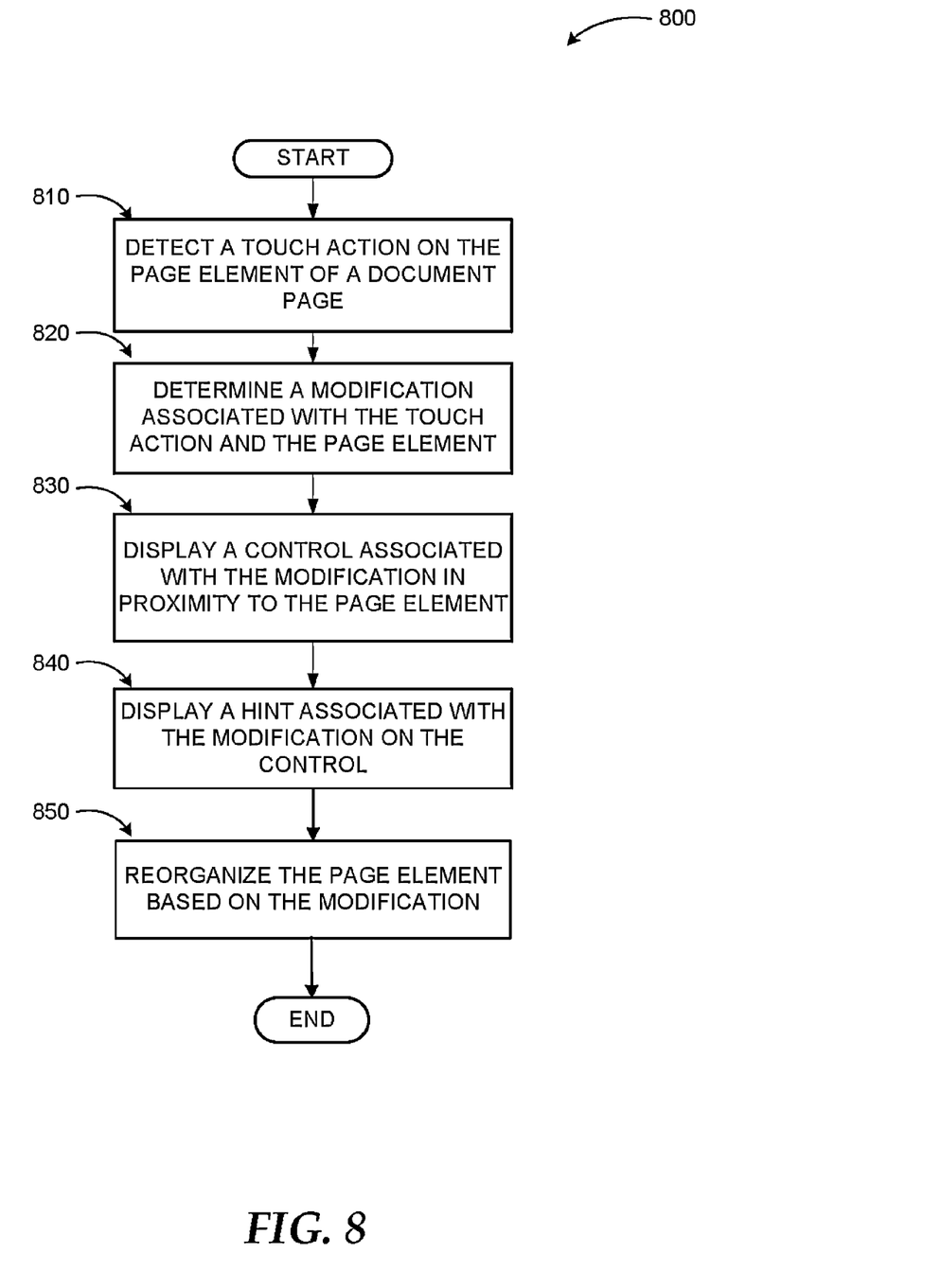
FIG. 8 illustrates a logic flow diagram for a process to provide a touch-based reorganization of a page element, according to embodiments.

FIG. 8 illustrates a logic flow diagram for a process to provide a touch-based reorganization of a page element, according to embodiments. Process 800 may be implemented in an application such as a word processing application, a spreadsheet application, a presentation application, or similar ones.

Process 800 begins with operation 810 detecting a touch action on a page element of a document page. Next, at operation 820, a modification associated with the touch action and the page element may be determined. A control associated with the modification may be displaced in proximity to the page element at operation 830. A hint associated with the modification may be displayed on the control at operation 840. At operation 850, the page element may be reorganized based on the modification.

The operations included in process 800 are for illustration purposes. An application as discussed above may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide a touch-based reorganization of a page element, the method comprising:
   in response to detecting a touch action on the page element of a document page, executing a visual change on the page element, wherein the visual change includes a modification to a section color associated with the page element and two or more of: an outline of the page element, a drop shadow of the page element, a ghost out of the page element, a de-emphasis of the page element, and an animation of the page element;
   determining a modification associated with the touch action and the page element;
   including an operation in the modification of the page element, wherein the operation includes a hierarchical reorganization of the page element and one or more of a vertical reorganization of the page element and a horizontal reorganization of the page element;
   displaying a control associated with the modification in proximity to the page element;
   associating the control with a graphic of the document page and one or more of a table of the document page, a video of the document page, text of the document page, and audio of the document page as the page element; and
   displaying a hint in a proximity relative to the touch action to inform a user of the modification to be performed on the document page.

2. The method of claim 1, further comprising:
displaying another control encompassing the page element after the reorganizing based on the modification.

3. The method of claim 2, further comprising:
including selection controls within the other control to expand or shrink a selection associated with the modified page element; and
placing the selection controls at a start and an end of the selection.

4. The method of claim 1, further comprising:
in response to associating the control with the text of the document page as the page element, displaying the hint to inform the user of the modification to be performed on the text.

5. The method of claim 1, further comprising:
associating the control with a document part as the page element, wherein the document part includes at least one from a set of: a paragraph, a section, a table of contents, a header, a footer, a page column, a page, and a group of pages; and
displaying the hint to inform a user of the modification to be performed on the document part.

6. The method of claim 1, further comprising:
associating the control with a bullet list of the document page as the page element; and
displaying the hint to inform a user of the modification to be performed on the bullet list.

7. The method of claim 6, further comprising:
applying the modification to at least one from a set of: one or more elements of the bullet list and an entirety of the bullet list.

8. The method of claim 1, further comprising:
in response to associating the control with the table of the document page as the page element, displaying the hint to inform the user of the modification to be performed on the table.

9. The method of claim 8, further comprising:
applying the modification to at least one from a set of: an entirety of the table, one or more columns of the table, one or more rows of the table, and one or more cells of the table.

10. The method of claim 1, further comprising:
including at least one operation from a set of: a formatting, a movement, a removal, an edit, a highlighting, an expansion, and a reduction during the modification of the page element or a portion of the page element.

11. The method of claim 10, further comprising:
including another operation in the modification of the page element or a portion of the page element, wherein the other operation includes one or more of: an indent, an outdent, a left align, a center align, and a right align.

12. A computing device to provide a touch-based reorganization of a page element, the computing device comprising:
  a memory;
  a processor coupled to the memory, the processor executing an application in conjunction with instructions stored in the memory, wherein the application is configured to:
    in response to detecting a touch action on the page element of a document page, execute a visual change on the page element, wherein the visual change includes a modification to a section color associated with the page element and two or more of: an outline of the page element, a drop shadow of the page element, a ghost out of the page element, a de-emphasis of the page element, and an animation of the page element;
    determine a modification associated with the touch action and the page element;
    include an operation in the modification of the page element, wherein the operation includes a hierarchical reorganization of the page element and one or more of a vertical reorganization of the page element and a horizontal reorganization of the page element;
    display a control associated with the modification in proximity to the page element;
    associate the control with a graphic of the document page and one or more of a table of the document page, a video of the document page, text of the document page, and audio of the document as the page element;
    display a hint in a proximity relative to the touch action associated with the modification on the control;
    reorganize the page element based on the modification by positioning the page element at a location on the document page as determined by the touch action; and
    display another control encompassing the page element after reorganizing based on the modification to modify a selection associated with the page element.

13. The computing device of claim 12, wherein the application is further configured to:
  determine the modification based on a context associated with the touch action and the page element.

14. The computing device of claim 12, wherein the application is further configured to:
  render the control and the hint to follow the touch action.

15. The computing device of claim 12, wherein, the application is further configured to:
  render the page element to follow the touch action.

16. The computing device of claim 15, wherein the application is further configured to:
  move adjacent page elements to clear a space for the page element during a course of a movement of the page element;
  animate the page element with a slide during the movement;
  move the adjacent page elements to another space left behind by the page element subsequent to the movement.

17. The computing device of claim 12, wherein the application is further configured to:
  display one or more alignment guides to illustrate a state of the page element at a stop of the touch action.

18. A computer-readable memory device with instructions stored thereon to provide touch-based reorganization of a page element, the instructions comprising:
  in response to detecting a touch action on the page element of a document page, executing a visual change on the page element, wherein the visual change includes a modification to a section color associated with the page element and two or more of: an outline of the page element, a drop shadow of the page element, a ghost out of the page element, a de-emphasis of the page element, and an animation of the page element;
  determining a modification associated with the touch action and the page element;
  including an operation in the modification of the page element, wherein the operation includes a hierarchical reorganization of the page element and one or more of a vertical reorganization of the page element and a horizontal reorganization of the page element;
  displaying a control associated with the modification in proximity to the page element;
  associating the control with a graphic of the document page and one or more of a table of the document page, a video of the document page, text of the document page, and audio of the document page as the page element;
  displaying a hint in a proximity relative to the touch action associated with the modification on the control;
  reorganizing the page element based on the modification by positioning the page element at a location on the document page as determined by the touch action;
  rendering one or more alignment guides to illustrate a state of the page element at a stop of the touch action; and
  displaying another control encompassing the page element after reorganizing based on the modification to modify a selection associated with the page element.

19. The computer-readable memory device of claim 18, wherein the instructions further comprise:
  including another operation during the modification of the page element or a portion of the page element, wherein the other operation includes one or more of: a formatting, a movement, a removal, an edit, a highlighting, an expansion, a reduction, an indent, an outdent, a left align, a center align, and a right align.

20. The computer-readable memory device of claim 18, wherein the instructions further comprise:
  rendering the page element to follow the touch action
  moving adjacent page elements to clear a space for the page element during a course of a movement of the page element;
  animating the page element with a slide during the movement;
  moving the adjacent page elements to another space left behind by the page element subsequent to the movement.

* * * * *